Feb. 11, 1947. C. B. SHIELDS Re. 22,841

RAILWAY TRAFFIC CONTROLLING APPARATUS

Original Filed March 19, 1941 5 Sheets-Sheet 1

INVENTOR
Charles B. Shields
BY
HIS ATTORNEY

Feb. 11, 1947. C. B. SHIELDS Re. 22,841

RAILWAY TRAFFIC CONTROLLING APPARATUS

Original Filed March 19, 1941 5 Sheets-Sheet 2

INVENTOR
Charles B. Shields
BY
HIS ATTORNEY

Feb. 11, 1947. C. B. SHIELDS Re. 22,841

RAILWAY TRAFFIC CONTROLLING APPARATUS

Original Filed March 19, 1941 5 Sheets-Sheet 3

INVENTOR
Charles B. Shields
BY
HIS ATTORNEY

Feb. 11, 1947. C. B. SHIELDS Re. 22,841

RAILWAY TRAFFIC CONTROLLING APPARATUS

Original Filed March 19, 1941 5 Sheets-Sheet 4

INVENTOR
Charles B. Shields
BY
HIS ATTORNEY

Feb. 11, 1947. C. B. SHIELDS Re. 22,841

RAILWAY TRAFFIC CONTROLLING APPARATUS

Original Filed March 19, 1941 5 Sheets-Sheet 5

INVENTOR
Charles B. Shields
BY
HIS ATTORNEY

Reissued Feb. 11, 1947 Re. 22,841

UNITED STATES PATENT OFFICE 22,841

RAILWAY TRAFFIC CONTROLLING APPARATUS

Charles B. Shields, Penn Township, Allegheny County, Pa., assignor to The Union Switch and Signal Company, Swissvale, Pa., a corporation of Pennsylvania Original No. 2,349,680, dated May 23, 1944, Serial No. 384,106, March 19, 1941. Application for reissue May 18, 1945, Serial No. 594,394

14 Claims. (Cl. 246—3)

Figure 1A:
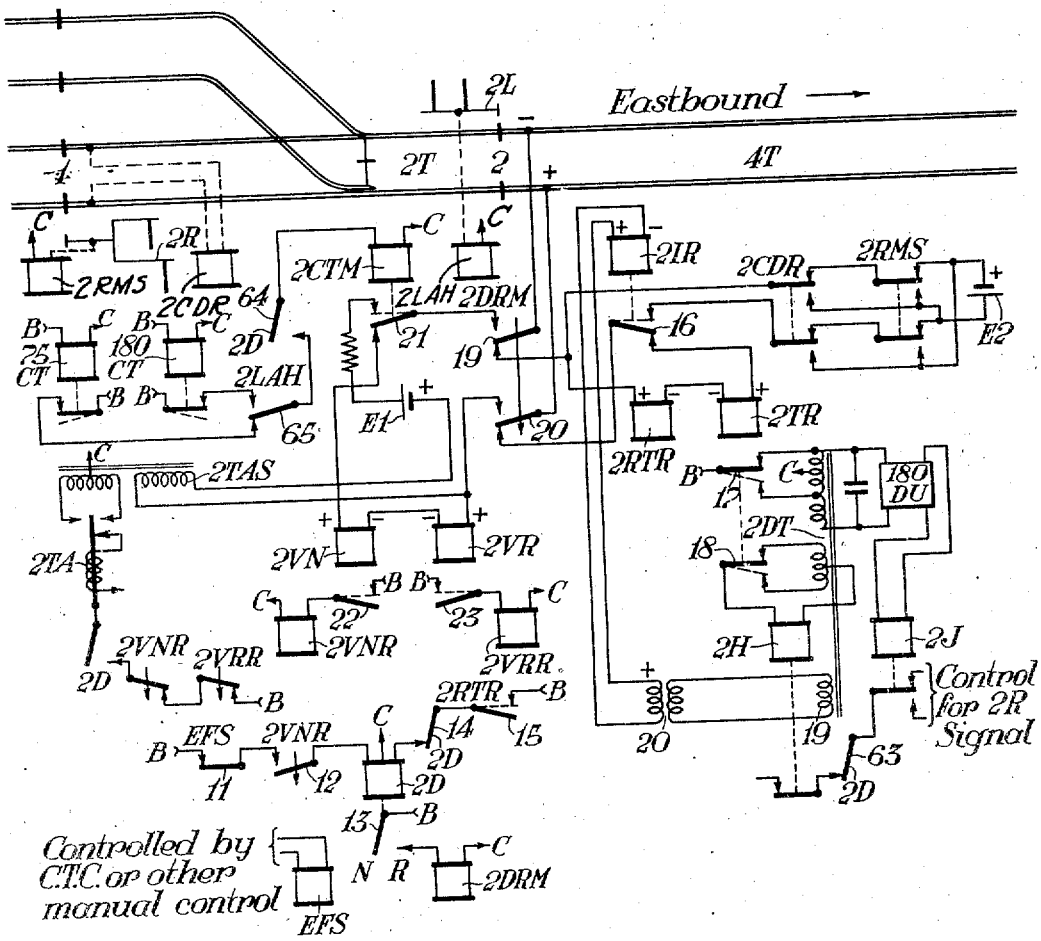
Figure 1B:
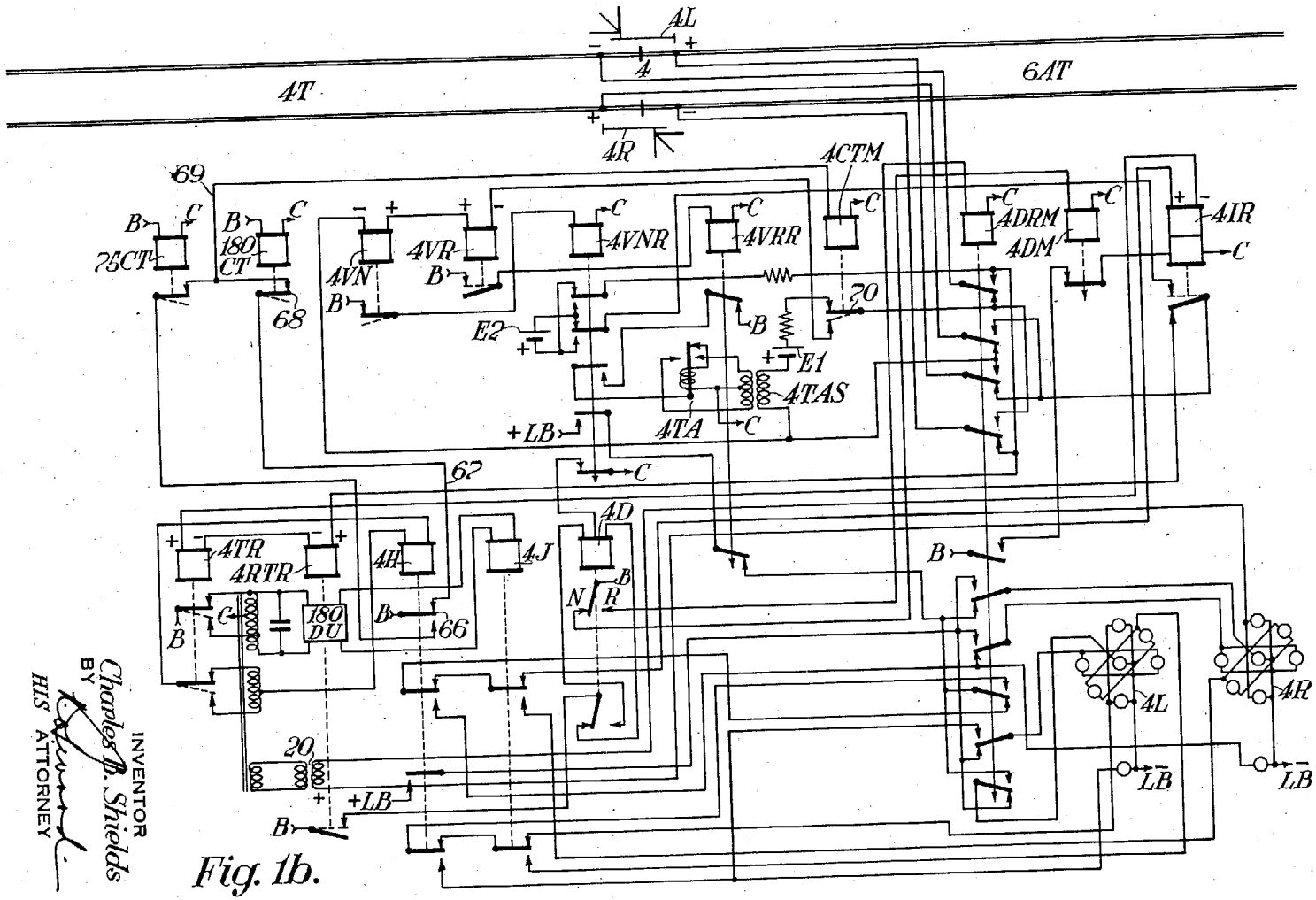
Figure 1C:
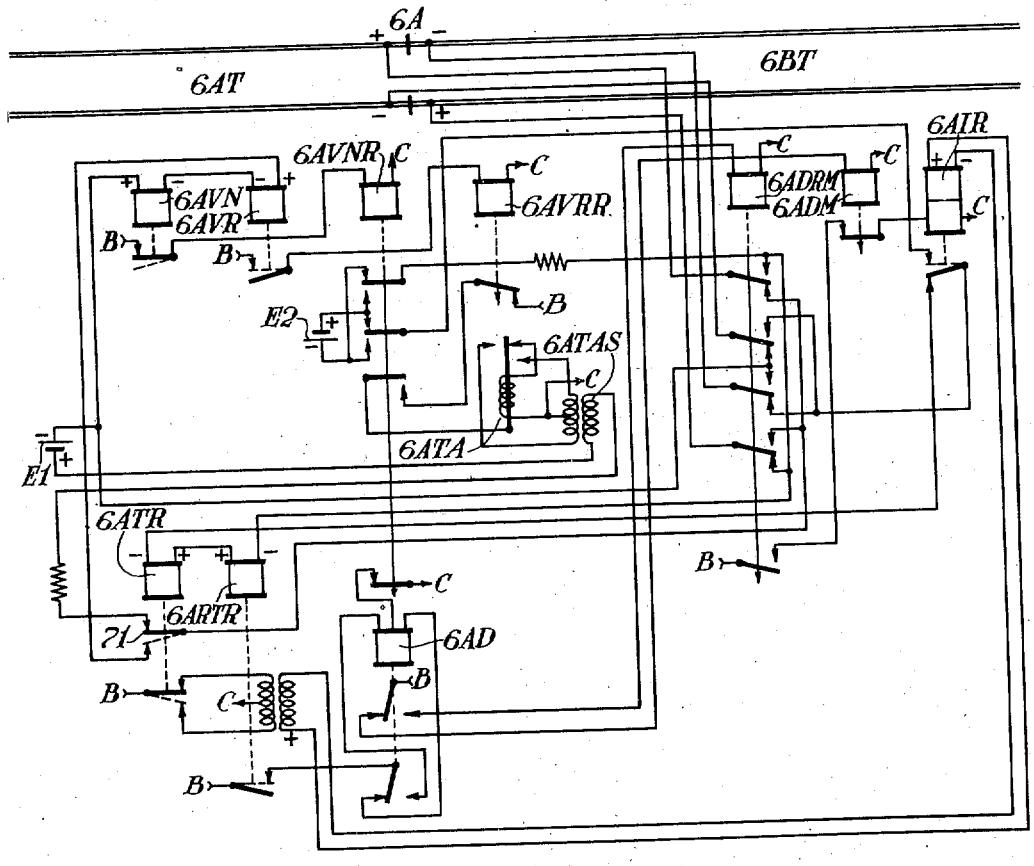
Figure 1D:
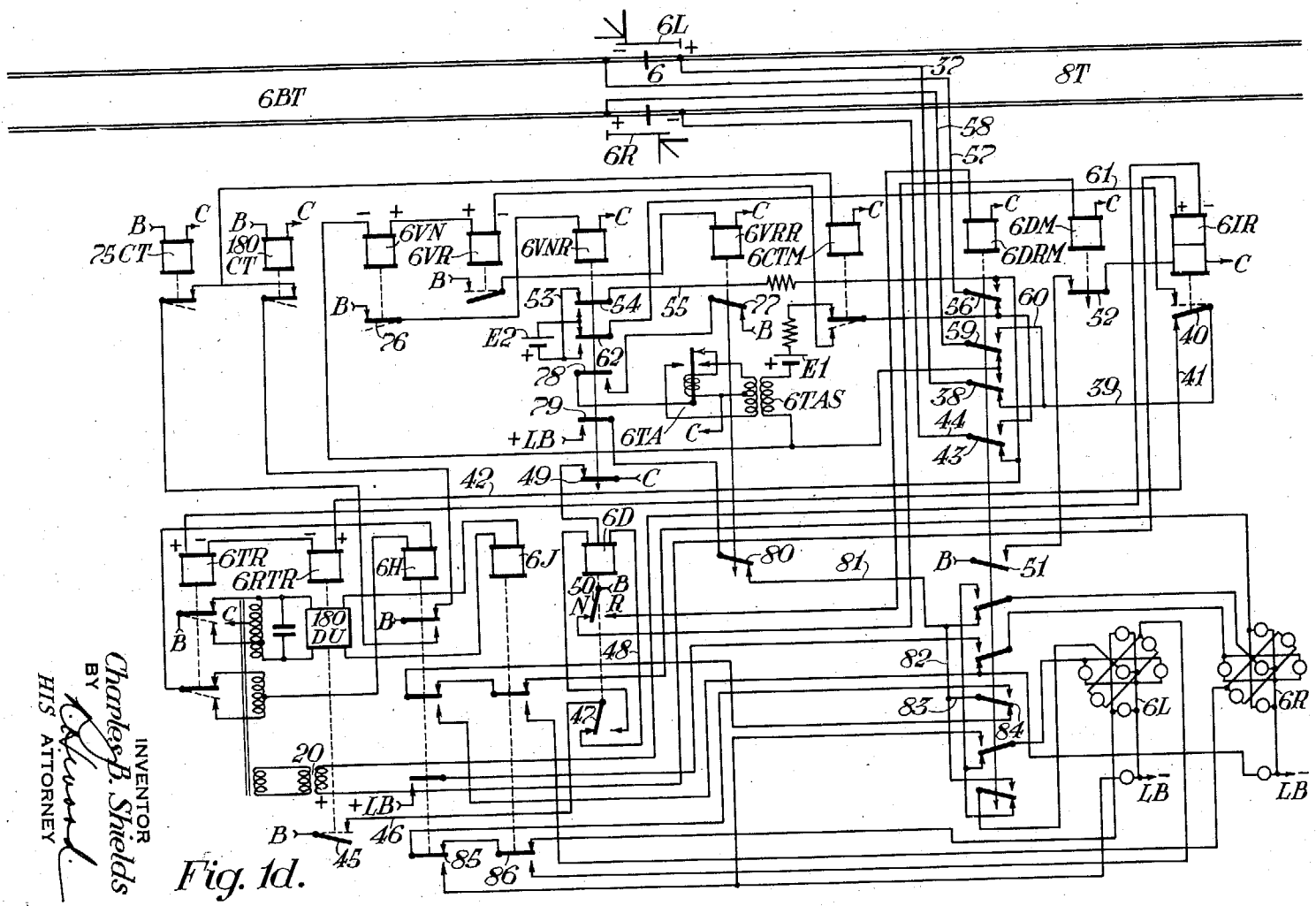
Figure 1E:
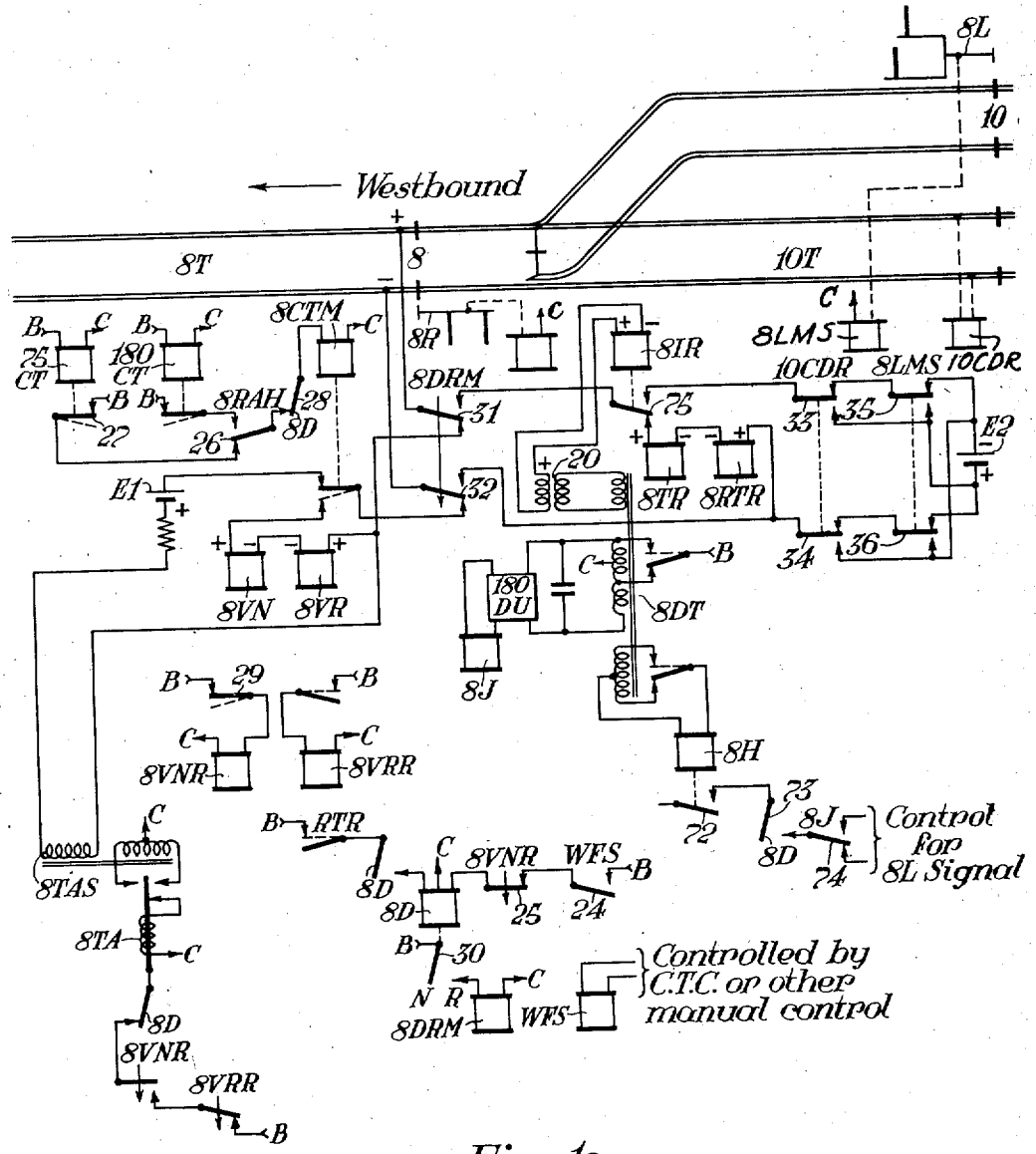

My invention relates to railway traffic controlling apparatus of the type in which coded track circuits are applied to single track, two direction signaling. More specifically, my invention relates to a signaling system of the above character in which the direction of traffic is established by a code sent out from a centralized traffic control location or by other suitable manual control. Accordingly, the directional control in the system embodying my invention is not automatic as in the case of standard A. P. B. circuits.

A feature of my invention is the provision for reversal of traffic direction without the use of the usual control line wires, by means of a momentary reversal of the track circuit polarity. Another feature of my invention is the provision of directional locking between head-block signals so that when either headblock signal is cleared or the section is occupied by a train the traffic direction cannot be reversed or the opposing headblock signal cleared. A further feature of my invention is the approach control of the wayside signals and the train control energy by means of polarity selection of the approach code.

One object of my invention is to dispense with all control line wires except the C. T. C. line and to provide a safe and effective system of two direction, single track signaling. A further object of my invention is to economize electrical energy in the system by providing for approach control of the wayside and cab signals. A still further object of my invention is to make use of the same track battery which supplies the approach code for supplying the reverse track energy upon a reversal of traffic direction. Other objects, purposes, and features of my invention will be apparent from the description which follows.

I accomplish the foregoing objects by employing a momentary reversal of the track circuit polarity which causes an automatic cascading action over the track circuits of the section and which reverses the entering and leaving ends of each track circuit and of the stretch. Instrumental in providing this reversal is a second track relay in series with the main track relay, responsive only to the reverse track circuit energy which is supplied momentarily to establish the new traffic direction. The approach energization of wayside and cab signals is accomplished through the medium of an approach code which is effective during the intervals between pulses of the ordinary signal control code. When the established traffic is eastbound, the westbound signals will normally be dark, but will display a stop indication to a train moving westbound. A similar operation takes place when the established traffic is westbound. I accomplish directional locking between headblocks by providing an approach or VR relay for each track circuit, so controlled that clearing of a headblock signal or entry of a train drops the first VR relay, whereupon the action is cascaded to the end of the stretch for governing the traffic direction control relay at that end to insure the stop indication of the opposing headblock signal.

I shall describe one form of apparatus embodying my invention, and shall then point out the novel features thereof in claims.

Figs. 1*a* to 1*e*, inclusive, of the accompanying drawings when placed end to end with Fig. 1*a* at the left, are a diagrammatic view showing one form of apparatus embodying my invention.

Similar reference characters refer to similar parts in each of the several drawings.

Referring to the drawings, there is shown a stretch of single track railway having a passing siding at each end thereof. This stretch of track is divided by means of the usual insulated joints at locations 1, 2, 4, 6A, 6, 8, and 10 into track circuit sections 2T, 4T, 6AT, 6BT, 8T and 10T, respectively. Locations 1, 2, 4, 6, 8, and 10 are signal locations whereas 6A is a cut section location which I have introduced to show the apparatus necessary in the case of a block which is very long. I shall use coded direct current of normal relative polarity supplied from a suitable battery E1 for the track circuit control, reversing the polarity of this current momentarily when the direction of traffic in the single track stretch is being reversed. Two rates of coding, 180 and 75 per minute, respectively, are supplied by the constantly operating code transmitters 180CT and 75CT, only two codes being required for the three-position signaling system illustrated. Since alternating current is ordinarily required for operating the locomotive cab signal equipment, I have provided approach energized tuned alternators TA at the various locations for supplying the coded train control energy. For approach control, I make use of a feed back or approach code supplied from a suitable track battery E2, the impulses of which are effective during the "off" intervals of the ordinary track circuit code, as will be described hereinafter.

At the left-hand or eastbound end of the stretch, I have provided an eastbound traffic control relay EFS which may be controlled by a remote operator over a C. T. C. line, or locally by means of a manual lever or other suitable means. A corresponding westbound traffic control relay WFS is shown at the right-hand or westbound end of the stretch. When relay EFS is energized, it initiates a cycle of operation which conditions the stretch (if unoccupied and the opposing headblock signal is at stop) for the passage of a train in the eastbound direction. Similarly, energization of relay WFS prepares the stretch for passage of a westbound train.

As shown in the drawings, the headblock signals 2R and 8L are at stop. This is also true of the remaining signals except 4R and 6R which are at clear since the last move through the stretch is assumed to have been in the eastbound direction. All of the signals are dark, however, since it is assumed that no train is approaching. Code is, however, being supplied to the track circuits since these are of the normally energized type. At each track circuit junction is a double-wound intermediate polarized direction selecting relay D which interchanges the entering and leaving ends of the associated track circuits and thereby determines the authorized traffic direction in these track circuits. At each end is a double-wound traffic direction selector (2D and 8D) which initiates the reversal of traffic direction and which controls all of the intermediate direction selecting relays as well as the traffic direction selector at the other end of the stretch.

Looking at Fig. 1*a*, the direction selector 2D at that location has an energizing circuit for its left-hand winding which includes one terminal B of a source of current, front contact 11 of relay EFS, front contact 12 of relay 2VNR (to be described later), and the other terminal C of the source. Relay 2VNR is now deenergized because relay 2VN is not operating, since front contact 19 of 2DRM is open. Accordingly, contact 12 is open, but selector relay 2D continues to occupy its normal position because its design is such that it continues to remain in its last operated position until a reversing impulse is received, whereupon it remains in the reverse position until again restored to normal. That is to say, the D relays are of the polar stick type. As shown, selector relay 2D occupies its normal position in which its contact 13 is swung to the left or N position. The closing of contact 14 of relay 2D prepares an energizing circuit for the right-hand winding of relay 2D so that if relay 2RTR should pick up (resulting from traffic reversal from eastbound to westbound) then selector relay 2D would be reversed by the momentary impulse of current which it would receive over front contact 15 of relay 2RTR and its own contact 14. The latter contact will immediately open, but not until a reversal of 2D has occurred and contact 13 is closed in its righthand or R position.

The impulse relay 2IR is well known in approach control circuits for coded wayside signaling. As used herein, this relay when deenergized connects the main track relay 2TR and the reverse track relay 2RTR in series across the track over the back point of its contact 16, and when energized, connects the battery E2 which supplies the approach code, across the track. It should be particularly noted that the code following track relays 2TR and 2RTR are oppositely poled so that but one of these relays (2TR) will normally follow code. When the track current polarity is momentarily reversed, however, relay 2RTR will be picked up as one step in the traffic direction changeover.

Relay 2TR controls the usual decoding transformer 2DT over its periodically operating contact 17 and so energizes the proceed relay 2J over the resonant decoding unit 180DU. Relay 2J will be picked up on 180 code but not on 75 code, in the usual manner. The caution relay 2H is likewise energized from a winding of the decoding transformer 2DT over the rectifying contact 18 of relay 2TR and this relay will be energized whenever 2TR is following either 180 or 75 code, but will be deenergized when 2TR ceases to follow code. The impulse relay 2IR is also energized from the decoding transformer 2DT by means of the winding 19 and the intermediate transformer 20. This transformer is not essential but may be used to improve the timing characteristics of relay 2IR. The impulse relay is of the biased polar type (biased to its deenergized position) and has a quick response whereby it is capable of following the impulses received from the decoding transformer. These impulses are, in effect, cycles of alternating current but the polarized feature permits the relay to pick up only on half-cycles of positive polarity, as indicated by the plus sign at one terminal of the relay, the bias insuring that the relay will release during each half-cycle of negative polarity. This manner of operating the impulse relay is well known and is shown and described in United States Reissue Patent No. 21,783 granted on April 29, 1941 to Herman G. Blosser for Approach control apparatus for railway signaling systems.

Relays 2VN and 2VR are polar code following relays which are instrumental in providing approach control and also directional locking between the headblock signals. Since Fig. 1*a* is an end location, these relays become operative only when relay 2DRM is picked up following a reversal of relay 2DR, that is, when front contacts 19 and 20 of relay 2DRM become closed and when the back point of contact 21 of the code transmitting relay 2CTM is also closed. Accordingly, the VN and VR relays at the eastbound end will be operative only under westbound traffic conditions; the VN and VR relays at the westbound end being operative only under eastbound traffic conditions which is the direction illustrated in the drawings. At intermediate locations, however, the VN and VR relays will be operative whenever approach or feed back code is being received, that is, whenever all the track circuits in advance thereof to the opposing headblock signal are unoccupied. It will be noted that relays 2VN and 2VR are connected in series and are oppositely poled so that but one of these relays will operate at any given time, depending on the polarity of the feed back code received from the track. Relays 2VNR and 2VRR are merely slow acting repeaters of relays 2VN and 2VR, respectively, and these remain constantly picked up provided that the respective control contact 22 or 23 is following code.

The tuned alternator 2TA is well known and is shown diagrammatically to simplify the disclosure. It is shown merely to make the disclosure more complete and its purpose is to provide a source of alternating cab signaling current in the absence of the usual alternating current transmission line. This tuned alternator is approach energized, as are the signals, and it delivers alternating current from its winding 2TAS to westbound traffic in track circuit 4T, by virtue of the inclusion of winding 2TAS in series with the normal code current supply battery E1 in the feed circuit for track circuit 4T when relay 2DRM is energized and relay 2CTM is operating.

Having described some of the individual apparatus which enters into the operation of my system, I shall now proceed to describe the steps involved in a reversal of traffic direction in the section and the operation which takes place as a train progresses through the section. As the apparatus stands, normal signal control code is being supplied to track circuit 8T from battery E1 by the coding action of relay 8CTM and this code is cascaded over the track circuits to the eastbound end in a manner to be described hereinafter. Relay 2TR follows code and operates relay 2IR which supplies feed back code from battery E2 to the track circuit 4T, from which the feed back code is cascaded to the westbound end where it operates relay 8VN, causing relay 8VNR to be energized.

Since the drawings show the apparatus set up for an eastbound move, I shall assume that it is desired to reverse the traffic direction to permit a westbound train to pass over the stretch. To do this, the operator will send out a suitable C. T. C. code which will pick up the westbound stick relay WFS at the westbound end of the stretch shown in Fig. 1*e*. Since relay 8VNR is energized, the pickup of relay WFS will reverse traffic direction selector relay 8D to the right because the right-hand winding of this relay will now become energized over front contact 24 of WFS and front contact 25 of 8VNR. Signal 8R being at stop, its home relay 8RAH (the control of which is well known) will be deenergized so that back contact 26 will be closed. Just prior to the reversal of relay 8D, the code transmitting relay 8CTM will be operating on 75 code by virtue of the 75 code circuit which extends from one terminal B, contact 27 of code transmitter 75CT, back contact 26 of relay 8RAH, and normal contact 28 of relay 8D, to the other terminal C. As will be shown hereinafter, the supply of 75 code to section 8T causes 180 code to be supplied to section 6BT and cascaded to the eastbound end from which a 180 feed back code is cascaded back to section 8T. Relay 8VN is now following these impulses of 180 feed back code and so causes its repeater 8VNR to remain energized due to code operation of front contact 29 of relay 8VN. Relay 8VNR, when energized, checks that no train is occupying the section between signals 2L and 8R, and also that the track circuit 2T is unoccupied and signal 2R is at stop so that its locking relay 2RMS is energized.

As soon as relay 8D reverses, relay 8CTM ceases to follow code and relay 8DRM is picked up over contact 30 of relay 8D, now in its reverse position. The pick-up of 8DRM closes the front points of contacts 31 and 32 so that an impulse of feed back energy can be received from section 8T by relay 8TR. A feed back impulse will be transmitted to section 8T even after normal code to this section is discontinued and relay 6TR has released because the last release of 6TR will pick up the impulse relay 6IR which will then transmit the feed back impulse from battery E2 over the front point of contact 40. Operation of relay 8TR by this impulse of feed back energy causes response of impulse relay 8IR whereupon a current impulse of reverse polarity is supplied from battery E2 to the track circuit 8T over the front contacts 33 and 34, and 35 and 36, of relays 10CDR and 8LMS, respectively. Relay 10CDR is merely a code detection relay for track circuit 10T and detects the unoccupied condition of this track circuit. The locking relay 8LMS checks the stop indication of headblock signal 8L and is energized when and only when this signal is at stop.

The reverse current impulse transmitted over the front contact 15 of relay 8IR from battery E2 is received by reverse track relay 6RTR at location 6 and it will be noted that this relay is poled in such a direction as to be operated by an impulse of reverse polarity but not of normal polarity, the latter impulses operating relay 6TR only. The pick-up circuit for relay 6RTR may be traced from the upper track rail, wire 37, back contact 38 of relay 6DRM, wire 39, back point of contact 40 of relay 6IR, wire 41, relays 6TR and 6RTR, wire 42, back contact 43 of relay 6DRM, and wire 44, back to the lower rail.

When relay 6RTR picks up, it closes the reverse energizing circuit for relay 6D over a path which includes front contact 45 or 6RTR, wire 46, normal contact 47 of relay 6D, wire 48, right-hand winding of relay 6D, and front contact 49 of relay 6VNR. The reversal of relay 6D causes pick-up of relay 6DRM over contact 50 of relay 6D in its reverse position, whereupon a holding circuit is established for relay 6IR over front contacts 51 and 52 of relays 6DRM and 6DM, respectively. This holding circuit includes the lower winding of relay 6IR and is sufficient to maintain this relay energized irrespective of whether the upper winding is or is not energized. Pick-up of 6IR causes a reverse current impulse to be transmitted from battery E2 to the track circuit 6BT over a path which includes one terminal of the battery, wire 53, front point of contact 54 of 6VNR, wire 55, front point of contact 56 of 6DRM, wire 57, upper rail of track circuit 6BT, lower rail, wire 58, front point of contact 59 of 6DRM, wires 60 and 39, front point of contact 40 of 6IR, wire 61, and front point of contact 62 of 6VNR, to the other terminal of battery E2.

At the cut section location 6A, the response of relay 6ARTR to the reverse code impulse and the consequent reversal of relay 6AD and pick-up of relays 6ADRM, 6ADM, and 6AIR will be clear from the previous description so that this description need not be repeated. Accordingly, it will be clear that a reverse code impulse will be transmitted into track circuit 6AT and finally ino track circuit 4T, so that the action which was initiated through the pick-up of relay WFS at location 8 which resulted in the application of reverse current to the first westbound section has been cascaded over each intervening track circuit, in turn, until the first eastbound section 4T has been reached. This cascading action provides assurance that the stretch is unoccupied because otherwise, the reverse code could not pass beyond the occupied track circuit.

At location 2, relay 2RTR will respond to the reverse code impulse and will reverse relay 2D over its front contact 15 and the normal contact 14 of relay 2D. When this happens, the control circuit for the eastbound headblock signal 2R will be interrupted at normal contact 63 of relay 2D and a 75 code operating circuit will be established for relay 2CTM over contact 64 of relay 2D in its reverse position and the back point of contact 65 of lock relay 2LAH for signal 2L. Since relay 2DRM is now picked up, normal polarity 75 code from battery E1 is supplied to the track circuit 4T over the front point of contact 21 of relay 2CTM. This 75 code causes response of relay 4TR at location 4 whereupon relay 4H picks up and closes the 180 code circuit for relay 4CTM over the front point of contact 66, wire 67, 180 code contact 68, and wire 69. The 180 code will be relayed into track circuit 6AT by virtue of the operation of contact 70 of relay 4CTM which codes the current from battery E1. At location 6A, the front point of contact 71 of relay 6ATR will relay the 180 code into track circuit 6BT in an obvious manner. The cascading of the normal code into track circuit 8T will be clear from the foregoing.

At location 8, since relay 8DRM is picked up, relay 8TR will receive and follow the 180 code so that relays 8J and 8H will both be energized and westbound headblock signal 8L will be cleared over a circuit which includes front contact 72 of relay 8H, reverse contact 73 of relay 8D, and the front point of contact 74 of relay 8J. The clearing of this signal indicates that the stretch between headblock signals is unoccupied; that all of the D relays have been reversed and that the track circuits are in proper working order since code has been cascaded to the new entering end; and that the opposing headblock signal is at stop. Since relay 8TR is now operating and relay 8DRM is up, feed back or approach code for the approach energization of the signals will be supplied to section 8T over the front contact 75 of relay 8IR and this code will be cascaded to the eastbound end since each of the intermediate TR relays is operating. The clearing of signal 8L caused release of relay 8LMS so that the feed back energy supplied to the rails of section 8T is of the polarity effective to operate relay 6VR but will not operate relay 6VN. After a westbound train passes signal 8L and enters track circuit 10T, the code detecting relay 10CDR will be released so that after signal 8L goes to stop and relay 8LMS picks up battery E2 will continue to supply approach code of the polarity effective to operate relay 6VR. As relay 6VN is released its contact 76 opens the circuit of relay 6VNR and it is released to govern the polarity of the energy supplied from battery E2 at that location to the track circuit 6BT. This approach code is thus cascaded over each intervening track circuit to track circuit 4T so that all of the VN relays are released and all of the relays VR are picked up. In this manner directional locking between headblock signals is obtained because the direction selecting relay D cannot be reversed, once a headblock signal has been cleared or a train enters the stretch, due to the fact that this relay is controlled over a front contact of the VNR relay which is a repeater of the relay VN, now deenergized.

Referring again to the entry of the train into the track circuit 10T, once the train passes location 8, the approach code received by relay 6VR at location 6 will be shunted so that both relays 6VR and 6VRR will release, relay 6VNR having been previously released. This results in the energization of the tuned alternator 6TA over the back contacts 77 and 78 of relays 6 VRR and 6VNR which results in the supply of train control current, coded at the proper rate by relay 6CTM, from the winding 6TAS to the track rails of section 8T ahead of the train. Also, the proceed aspect of signal 6L will now be displayed because of the closing of the clear signal circuit as follows: from one terminal +LB, back contact 79 of relay 6VNR, back contact 80 of relay 6VRR, wires 81, 82, and 83, front point of contact 84 of relay 6DRM, and front points of contacts 85 and 86 of relays 6H and 6J, respectively, to the proceed unit of the signal 6L and terminal —LB.

When the train enters the track circuit 6BT, train control energy will be fed towards the train in a similar manner from the winding 6ATAS of the tuned alternator at location 6A. The clearing of signals 4L and 2L will occur in a similar manner to that described for signal 6L and so this description need not be repeated.

From the foregoing description, it will be apparent that I have provided an effective signaling system for two direction running on single track, with approach control and directional locking, all without the use of control line wires. Also, I have employed only the usual 180 and 75 codes which provide three position signal aspects, but by transmitting these codes both in the normal and in the reverse direction under proper track circuit conditions and by making selective use of current polarity in these codes, I have provided a system in which the traffic direction reversal and passage of traffic in the new direction is readily and safely accomplished.

Although I have herein shown and described only one form of apparatus embodying my invention, it is understood that various changes and modifications may be made therein within the scope of the appended claims without departing from the spirit and scope of my invention.

Having thus described my invention, what I claim is:

1. In combination with a stretch of track over which traffic may move in either direction, said stretch being divided into a plurality of track circuit sections, an eastbound and a westbound polarized traffic direction selector at the respective ends of said stretch, a polarized traffic direction relay at the junction of each pair of said track circuit sections, an eastbound and a westbound headblock signal at the respective ends of said stretch, means governed by said westbound selector when occupying its normal position for supplying coded current of normal relative polarity to the end track circuit at the westbound end and for maintaining said westbound signal at stop, means for cascading said coded current over the remaining track circuits of said stretch to the eastbound end, means effective when said eastbound selector occupies its normal position and said coded current is effective in the section at said eastbound end for conditioning said eastbound signal to display its proceed indication, means at said eastbound end effective for supplying feed back code impulses to said end track circuit during the "off" intervals of said coded current to maintain the adjacent traffic direction relay in its normal position, means including said last-mentioned relay for cascading said feed back code over the remaining track circuits to said westbound end to maintain the remaining traffic direction relays in their normal position and provide approach energization for eastbound traffic moving over said stretch, and means effective upon a reversal of said westbound selector from its normal to its reverse position for supplying an impulse of reverse relative polarity to the section at said westbound end to reverse all of said traffic direction relays including said eastbound selector in sequence to thereby place said eastbound signal at stop and condition said westbound signal to display its proceed indication.

2. In combination with a stretch of track over which traffic may move in either direction, said stretch being divided into a plurality of track circuit sections, an eastbound and a westbound headblock signal at the respective ends of said stretch, a main and an auxiliary track relay for each of said sections receiving energy from the rails thereof and selectively responsive to current of normal and reverse polarity respectively, a traffic direction selector having a normal position for setting said westbound signal at stop and for applying coded current of normal relative polarity to the westbound end section, said current being cascaded from the westbound to the eastbound end of said stretch by virtue of the response of the main track relays sequentially thereto, means controlled by the last main track relay for conditioning said eastbound signal to indicate proceed, means effective upon a reversal of said traffic direction selector for supplying an impulse of current of reverse relative polarity to said westbound end section for operating the auxiliary track relay associating therewith, said reverse polarity impulse being cascaded to the eastbound end of said stretch by virtue of the response of said auxiliary track relays sequentially thereto, the last auxiliary relay setting said eastbound signal at stop, and means controlled by said last auxiliary relay for causing coded current to be cascaded from said eastbound to said westbound end for clearing said westbound headblock signal.

3. In combination with a stretch of track over which traffic may move in either direction, said stretch being divided into a plurality of track circuit sections, an eastbound and a westbound headblock signal at the respective ends of said stretch, a main and an auxiliary code following track relay for each of said sections connecting in series and normally receiving coded current from the associated section, said relays being selectively responsive to current of normal and reverse polarity respectively, an eastbound and a westbound traffic direction selector at the respective ends of said stretch each having a normal and a reverse position for establishing eastbound and westbound traffic direction respectively over said stretch, means controlled by said westbound selector when normal for placing said westbound headblock signal at stop and for supplying coded current of normal relative polarity to the track circuit at that end for operating the main track relay associated therewith, said main track relay causing coded current to be cascaded over the remaining track circuits by virtue of the operation of the remaining main track relays, means controlled by the last main track relay and by said eastbound selector when normal for conditioning said eastbound headblock signal to indicate proceed, other means controlled by said last main track relay for cascading impulses of an approach code over the track circuits from the eastbound to the westbound end of said stretch during the "off" intervals of said coded current, means effective when said westbound selector is moved to its reverse position for transmitting a reverse polarity impulse to the track circuit at the westbound end for operating the auxiliary track relay associated therewith, said reverse polarity impulse being cascaded over the remaining sections by the intervening auxiliary relays to operate the last auxiliary track relay, and means controlled by said last auxiliary track relay for causing said eastbound selector to assume its reverse position and so to reverse the direction of traffic over said stretch.

4. In combination with a stretch of track over which traffic may move in either direction, said stretch being divided into a plurality of track circuit sections, an eastbound and a westbound headblock signal at the respective ends of said stretch, a manually controlled selector having a normal position for eastbound traffic and a reverse position for westbound traffic, means controlled by said selector when normal for placing said westbound headblock signal at stop and for supplying coded current of normal relative polarity to the westbound end track circuit, said current being cascaded over the track circuits to the eastbound end to thereby check the unoccupancy of said stretch, a normal code following track relay at the eastbound end selectively responsive to said coded current of normal polarity for conditioning said eastbound signal to indicate proceed, means effective when said manually controlled selector is reversed for supplying an impulse of current of reverse relative polarity to said westbound end track circuit, a reverse code following track relay for said last-mentioned track circuit selectively responsive to said reverse polarity impulse, and means controlled by said reverse track relay for setting said eastbound signal to stop and for conditioning said westbound signal to indicate proceed to thereby reverse the direction of traffic over said stretch.

5. In combination with a stretch of railway track over which traffic may move in either direction, said stretch being divided into a plurality of track circuit sections, an eastbound and a westbound headblock signal at the respective ends of said stretch, an eastbound and a westbound manually controlled selector at the respective ends of said stretch each having a normal position for eastbound traffic and a reverse position for westbound traffic, a normal code following track relay and a reverse code following track relay for each track circuit selectively responsive to current of normal and reverse polarity respectively, a polarized traffic direction relay for each track circuit normally occupying its normal position and caused to assume its reverse position in response to code following operation of its associated reverse track relay, means controlled by said westbound selector when normal for setting said westbound signal at stop and for supplying coded current of normal relative polarity to the westbound end track circuit to thereby operate the normal track relay associated therewith and cause coded current to be cascaded over said sections to the eastbound end, means controlled by the last normal track relay and by said eastbound selector for conditioning said eastbound signal to indicate proceed and for supplying current impulses to the sections of said stretch for approach control, said current impulses being supplied during the "off" intervals of said coded current, means effective when said westbound selector is reversed for supplying a reverse polarity impulse to the westbound end track circuit to operate the associated reverse track relay and so to reverse the polarized direction relay associated therewith, means controlled by said last-mentioned relay and including the remaining reverse track relays for cascading said reverse impulse to the eastbound end, and means controlled by the last reverse track relay for reversing said eastbound selector to thereby complete the reversal of traffic direction over said stretch.

6. In combination with a stretch of track over which traffic may move in either direction, said stretch being divided into a plurality of track circuit sections, a manually controlled traffic direction selector at one end of said stretch, means controlled by said selector when normal for supplying coded current to the track circuit at that end of the stretch and cascading the coded current over the remaining track circuits to the other end to check unoccupancy of the stretch, means for supplying impulses of normal polarity feed back code during the "off" intervals of said coded current to the end track circuit at said other end and cascading said feed back code over said stretch by means of a first code responsive relay associated with each section and selectively responsive to said normal polarity code, a second code responsive relay for each section arranged in energy receiving relation with the track and selectively responsive to feed back code of reverse relative polarity, means effective when a train enters said stretch at said one end and releases said first code responsive relay associated therewith for pole changing the feed back code supplied to the next section in advance to thereby operate said second code responsive relay for the next section and so to provide approach energization, and means effective upon a reversal of said traffic direction selector for momentarily reversing the polarity of said first-mentioned coded current to thereby operate traffic direction selecting apparatus for each section and so to reverse the traffic direction in said stretch.

7. In a two direction single track system of signaling, a track circuit at the entering end of the stretch for a given direction of traffic movement, means including a two-position traffic direction selector in its normal position for supplying coded current of normal relative polarity to said track circuit at the entering end thereof, means for supplying feed back code during the "off" intervals of said coded current to said track circuit at the leaving end thereof provided said single track stretch is unoccupied, a control relay energized in response to the presence of said feed back code, a polarized traffic direction relay energized over a front contact of said control relay to thereby prevent reversal of said traffic direction relay during occupancy of said track circuit and so to provide directional locking, means effective upon a reversal of said traffic direction selector for momentarily reversing the polarity of said first-mentioned coded current, and a reverse track relay for said track circuit selectively responsive to said reverse polarity current for reversing said polarized relay to thereby reverse the traffic direction over said track circuit.

8. In a two direction single track system of signaling, a track circuit at the entering end of the stretch for a given direction of traffic movement, means including a manually controlled two position traffic direction selector in its normal position for supplying coded current of normal relative polarity to said track circuit for controlling traffic movement in said given direction over said track circuit, a polarized reverse track relay for said track circuit, a polarized traffic direction relay for said track circuit controlled over a front contact of said reverse track relay, means effective upon a reversal of said traffic direction selector for momentarily reversing the polarity of said coded current to thereby operate said reverse track relay and so to reverse said traffic direction relay, and means controlled by said traffic direction relay for reversing the traffic direction over said track circuit.

9. In a two direction single track system of signaling, a track circuit at the entering end of the stretch for a given direction of traffic movement, means including a two position traffic direction selector in its normal position for supplying coded current of normal relative polarity from a first source to said track circuit at the entering end thereof for controlling traffic movement in said given direction over said track circuit, a polarized reverse track relay for said track circuit, means effective upon a reversal of said traffic direction selector for momentarily supplying an impulse of reverse relative polarity from a second source to thereby operate said reverse track relay, means controlled by said reverse track relay for reversing the traffic direction in said track circuit, and means controlled by said selector when reversed and effective when the traffic direction has been reversed for supplying an approach code from said second source to said track circuit.

10. In a two direction single track signaling system, a track circuit at the entering end of the stretch for a given direction of traffic movement, a two position traffic direction selector, a code following relay, means including a normal contact of said selector for supplying code to said relay to cause code following operation thereof, a polarized approach relay, means including a contact of said code following relay and effective when said selector is normal for alternately supplying coded current of normal relative polarity to said track circuit at the entering end thereof and connecting said approach relay to receive approach code impulses therefrom, said approach code impulses being supplied during "off" intervals in said coded current provided the stretch beyond said track circuit is unoccupied, a polarized normal track relay associated with said track circuit at the entering end thereof, a polarized reversed track relay associated with said track circuit at the leaving end thereof, means effective when said selector is reversed for connecting said normal track relay with said track circuit to cause operation thereof on an impulse of said approach code, means effective when said normal track relay is operated for supplying an impulse of reverse relative polarity to said track circuit to operate said reverse track relay, and a traffic direction governing relay for said rack circuit controlled by said reverse track relay.

11. In a coded track circuit signaling system, in combination, a stretch of track over which traffic may move in either direction, means manually controlled from a remote control office for supplying coded energy to the rails of said track stretch at one end or the other in accordance with the direction of traffic being established, a signal at each end of the stretch governing entrance of traffic into the stretch, means for each signal manually controlled from said control office for conditioning the signal to clear dependent upon receipt of coded energy over the rails of the track stretch or for holding the signal at stop, and means for each end of the stretch for maintaining the supply of coded energy to the rails of the stretch as long as the signal at the other end of the stretch is cleared.

12. In a coded track circuit signaling system, in combination, a stretch of track over which traffic may move in either direction, means manually controlled from a remote control office for supplying coded energy to the rails of said track stretch at one end or the other in accordance with the direction of traffic being established, a signal at each end of the stretch governing entrance of traffic into the stretch, means for each signal manually controlled from said control office for conditioning the signal to clear dependent upon receipt of coded energy over the rails of the track stretch or for holding the signal at stop, and means at each end of the track stretch governed over the rails of the stretch for maintaining the supply of coded energy to the rails of the stretch as long as the signal at the other end of the stretch is cleared.

13. In a coded track circuit signaling system, in combination, a stretch of track over which traffice may move in either direction, the rails of said track stretch being divided into a plurality of track sections, signals at the ends of said sections for governing movement of traffic into and through said stretch in one direction or the other, each of said signals being controlled by coded track circuit energy supplied over the rails of the associated track section towards the signal, means at each end of the stretch manually controlled from a remote control office for conditioning the signal governing entrance of traffic into the stretch at that end to clear dependent upon receipt of coded energy over the rails of the associated track section or to hold said signal at stop, means at each end of the stretch manually controlled from said remote control office for supplying coded energy to the rails of the track section at that end of the stretch to thereby cause coded energy to be supplied in the same direction over the rails of the remaining sections of the stretch, and means for each end of the stretch for maintaining the supply of coded energy to the rails of the section at that end of the stretch as long as the signal governing entrance of traffice into the stretch at the other end is cleared and also while said stretch is occupied by a train.

14. In a coded track circuit signaling system, in combination, a stretch of track over which traffic may move in either direction, the rails of said track stretch being divided into a plurality of track sections, signals at the ends of said sections for governing movement of traffic into and through said stretch in one direction or the other, each of said signals being controlled by coded track circuit energy supplied over the rails of the associated track section towards the signal, means at each end of the stretch manually controlled from a remote control office for conditioning the signal governing entrance of traffic into the stretch at that end to clear dependent upon receipt of coded energy over the rails of the associated track section or to hold said signal at stop, means at each end of the stretch manually controlled from said remote control office for supplying coded energy to the rails of the track section at that end of the stretch to thereby cause coded energy to be supplied in the same direction over the rails of the remaining sections of the stretch, and means at each end of the stretch governed over the rails of the stretch for maintaining the supply of coded energy to the rails of the section at that end of the stretch as long as the signal governing entrance of traffic into the stretch at the other end is cleared and also while said stretch is occupied by a train.

CHARLES B. SHIELDS.

REFERENCES CITED

The following references are of record in the file of this patent:

UNITED STATES PATENTS

| Number | Name | Date |
|---|---|---|
| 2,357,518 | Judge | Sept. 5, 1944 |
| 2,357,240 | Van Horn | Aug. 29, 1944 |